United States Patent Office 2,772,178
Patented Nov. 27, 1956

2,772,178

PROCESS FOR PREPARING A COLD WATER SOLUBLE DEXTRIN ADHESIVE AND THE PRODUCT THEREOF

Walter G. Kunze and Raymond B. Evans, Catonsville, Md., and John W. Huebschmann, Decatur, Ill., assignors to National Starch Products Inc., New York, N. Y., a corporation of Delaware No Drawing. Application December 11, 1953, Serial No. 397,782

5 Claims. (Cl. 106—208)

This invention relates to a dry cold water soluble adhesive made from dextrin and to a method for manufacturing the same.

In order to bring out clearly the advantages of this invention, it will be necessary to recount the development of the prior art.

Prepared liquid dextrin or amylaceous adhesives have always been extensively used for sealing boxes and cartons in the packaging industry and for similar industrial applications. The success of these liquid adhesives is mainly due to the ease with which they can be used and due to the high degree of tackiness which they provide. These liquid adhesives are made by cooking dextrin or similar amylaceous materials in water and adding to this certain alkaline compounds such as borax, soda ash, and caustic soda. The only disadvantage associated with adhesives of this kind is that prepared liquid adhesives are uneconomical in use because the consumer must pay for the transportation of the water contained in them. For this reason, so-called cold water soluble dry adhesives were developed to supplant prepared liquid dextrin adhesives. Cold water soluble, dry adhesives consist essentially of dextrin powders and similar materials made especially to prevailing specifications, with alkaline salts such as borax and soda ash added.

It was soon found, however, that such dry mixes when added to cold water showed a number of important disadvantages such as:

They lumped badly when mixed with cold water and it took many hours to dissolve these lumps by continued stirring;

Even after dissolution of the lumps, complete hydration of the product and the consequent development of the right type of machine characteristics did not take place except upon letting the mixture stand from six to twenty-four hours; and Finally, a solution of the dextrin mixture prepared in cold water never reached the high degree of tackiness found in the above mentioned cooked products and which is so essential for the successful operation of high speed packaging machinery.

Attempts were therefore made to remedy the described faults, but it was not until the process and product of the present invention were discovered that all of the disadvantages of the former cold water soluble products could be eliminated in an economical manner.

The purpose, therefore, of this invention is to provide a dry dextrin (or amylaceous adhesive) mixture which is soluble in cold water without lumping; which requires much less time for hydration (becoming tacky); which shows a degree of tackiness equal or almost equal to that obtained with cooked dextrin mixtures; and which finally can be manufactured by an economical and continuous process. The dextrin starting material may be that obtained by known methods from corn, tapioca, potato, sago, waxy corn, arrow root and other similar sources.

Concerning the reasons for the "lumping" of dextrin compounds when mixed with cold water, it was found that when the dextrin particles are immersed in water, the peripheral portions absorb water rapidly and alter the structure of the particle in such manner that the innermore portions are not wetted, or can be wetted only with difficulty by long agitation. It will be seen, therefore, that the problems encountered in solubilizing a dextrin adhesive are due principally to the anomalous fact that the dextrin material is extremely hydrophilic and that the high rate of water absorption at the surface of the dextrin particles accounts for the "balling-up" of the dextrin when it is immersed in cold water. We have further observed that by altering the physical structure of the dextrin particles so that the water will not be occluded in the outer surface of the particle, the speed with which the dextrin may be solubilized in cold water can be considerably increased. This reformation of the dextrin particle can be accomplished by various physical means, such as densifying the dextrin particles between heavy pressure rolls, or by extruding the dextrin at high pressures through a restricted orifice. Processes such as these do satisfactorily overcome the above mentioned lumping of the dextrin, but many operational difficulties are encountered, since high heat generally accompanies the pressure necessary for the re-formation of the dextrin particles. As a result, fire hazards exist, and also the temperatures involved approach, and occasionally exceed, those at which the dextrin will caramelize. Processes of this kind, if very carefully controlled, will produce a dextrin of improved solution characteristics, but one having adhesive characteristics which are no better than those produced by the "dry" process which, as previously mentioned, are inferior to those manufactured by the so-called "wet" process. We have also discovered the remarkable fact that by a sintering and peptizing process, hereinafter described in detail, not only can the physical characteristics of the dextrin adhesive be changed to greatly improve its water dispersibility but, most important, the adhesive characteristics are improved to the extent that they are superior to those obtained by the usual "dry" process dextrin.

In order to obtain our improved result by the sintering process, we have found that it is essential to moisten the dextrin to a limited degree prior to the sintering, and before sintering to introduce certain additives which have the effect of creating tackiness in the solubilized dextrin product and also in a sense "peptizing" it so that it can readily be solubilized in cold water. It will be understood that the term "cold water solubility" is to some extent a relative expression, and that heretofore dextrins have been produced which are described as "cold water soluble." Many of these, however, must be agitated in water for a considerable length of time, and in addition to this, in order to develop the desired adhesive characteristics, must be permitted to stand or "age" for periods of anywhere from 6 to 24 hours. On the other hand, the dextrin obtained by this invention is cold water soluble to the extent that much less agitation and aging are required. In tackiness our new dextrin adhesives are comparable to cooked dextrins, and in addition, no aging period is necessary in order to develop its final and superior adhesive characteristics.

As mentioned above, our new process is characterized by the fact that a limited moistening of the dextrin is made prior to introducing the dextrin into heated zones where a controlled sintering occurs. We have found that, in order to obtain our improved results, it is necessary to prepare the dextrin by spraying or moistening it with about 15 to 75 percent, by weight, of water, depending upon the nature of the basic amylaceous material. The specified proportions are based on the dry weight of dextrin used. A mixture of this proportion of amylaceous base and water gives a crumply, damp mass, which, although it is not by any means liquid, can be formed into large balls which have the appearance of snowballs. Moistening of the amylaceous base with less than 15 percent water fails to produce the results obtained by our invention. If more than 75 percent water is added to the amylaceous base, it becomes too liquid and the desired advantages of the invention will not be obtained.

We have found that the process of our invention may be suitably carried out by introducing the amylaceous base and additives into a mixer and adding the described amounts of water to it by spraying the water onto the mixture. The mass thus obtained is made uniform by passing it through a disintegrating mill. The damp material received from the disintegrator mill may then be placed on an endless steel belt which conveys the material through a series of ovens in which the sintering and peptizing is accomplished. The belt carries the material through several temperature zones, the first of the zones being maintained at a higher temperature than the last one thereof. A slow drying is necessary, and this may be accomplished by any suitable combination of temperatures and time in the drying zones. In the following examples, specific temperatures are referred to in order to exemplify one specific combination of temperatures and time which is suitable, but this is done by way of example only. The governing consideration is that the temperature be regulated so that the mass dissolves, fuses, and turns first to a plastic material, and that subsequent dehydration be accomplished without scorching or caramelizing. The moisture in the dehydrated mass should be reduced to 5 to 15 percent, by dry weight of dextrin, depending again on the nature of the amylaceous starting material.

As mentioned above, certain alkalizing and improving additives are mixed with the dextrin or amylaceous base at the time it is moistened. For example, sodium carbonate and borax may be added prior to or at the time the water is introduced into the amylaceous base. Other common additives such as salt, various sodium phosphates, urea, or dicyandiamid, may be added to produce their known effects or to retain proper alkalinity of the amylaceous base being treated.

An important result of proceeding in the described manner is the fact that the additives, such as borax, soda ash, urea and so forth, will, under the influence of the heat applied during the sintering process, form a highly concentrated solution and thereby exert a powerful solvent or peptizing action upon the amylaceous base, so that after the entire process has been finished, the material is not only sintered and therefore will not lump or ball up in cold water, but will—and this is of far greater importance—have vastly improved characteristics, such as greater solubility, increased tackiness and higher adhesive strength. This is illustrated by the fact that when a mixture is made consisting of 100 parts of Corn Products #163 white dextrin, 18 parts of borax and 3 parts of soda ash, and cold water is added to this, nothing will happen and the dextrin will settle out practically undissolved. When, however, the same mixture is moistened with 75 percent water and then heat-treated as per our invention, the resulting product, when mixed with 2½ times its weight of cold water, will produce a heavy, gummy solution, eminently useful for technical application.

A further important improvement, for instance, is that an extended "standing" (hydration) period is not necessary after the adhesive material has been solubilized in order to develop the desired adhesive characteristics. A further important commercial advantage is that the new products take up more water and consequently are less expensive to the consumer, as a selected consistency of adhesive solution may be produced by adding a lesser amount of dextrin to a given amount of water. Another improved characteristic is that the new adhesive is more tacky and lends itself to more efficient use on packaging machinery run at high speeds.

The following examples illustrate some of the preferred forms of practicing our invention and the product obtained according to the invention.

Example I 1000 pounds of a fully converted corn dextrin were introduced into a mixing machine along with 180 pounds of borax and 30 pounds of soda ash. Water was then sprayed into the mixture until 200 pounds of water had been added. The borax employed was the usual commercial variety having 10 mols of water of crystallization. This mass was thoroughly mixed and then introduced into a disintegrator mill in order to make it uniform. The damp material taken from the disintegrator mill was spread onto an endless steel belt in a layer about ⅛ inch deep and conveyed successively through 3 heating zones. The belt traveled through the heating zones at a rate of about 80 inches per minute and each particle on the belt was within each zone for approximately 3 minutes. The air temperature in the first of the heating zones was held in the neighborhood of about 390° F., the second zone at about 360° F., and the third zone approximately 340° F. During the passage through the heating zone the dextrin mix first softened into a sluggish flowing plastic mass. In the course of its passage further moisture evaporated and a cohesive sheet of sintered material was formed. This sintered material cooled into a brittle sheet which was then milled to a fineness of about 200 mesh.

The material thus obtained was mixed with one and one-half as much cold water. It did not lump, but dissolved into a syrupy, tacky, amber adhesive ready for use in 20 minutes.

Following the same procedure as described above, dextrin obtained from potato and tapioca was processed to obtain an equally satisfactory non-lumping, cold water soluble adhesive.

Example II 1000 pounds of #158 Corn dextrin, made by Corn Products Refining Co., was mixed with 200 pounds of borax and 40 pounds of soda ash. 370 pounds of water were sprayed into the mixture. After mixing and disintegrating the material was conveyed through an endless steel belt drying oven as described in Example I, with the exception that the hot air temperature was raised about 35° F. in each section.

The material obtained after sintering and drying was milled to a fineness of 200 mesh. To 1 part of the milled material, 1¾ parts of water were added. No lumping occurred, and the solution was ready for use after 30 minutes stirring.

It will be seen from the foregoing description and examples that the preferred form of invention includes the use of 15 to 75 percent by weight of water to the dry dextrin, 7 to 25 percent by weight of borax, 0 to 5 percent by weight of soda ash. Other additives may also be used for their known effect in adhesive mixtures of this kind.

Having thus described the invention, what we claim as new and desire to secure by Letters Patent is:

1. A process for preparing a cold water soluble dextrin adhesive which comprises adding to dextrin about 15 to 75%, by weight of the dextrin, of water to moisten the dextrin, and 7 to 30% of an inorganic alkaline salt, thereafter sintering the mixture into a dried material at temperatures below the caramelization temperature of the dextrin.

2. A process for preparing a cold water soluble dextrin adhesive which comprises adding to dextrin about 15 to 75%, by weight of the dextrin, of water to moisten the dextrin, 7 to 25% borax, and less than about 5% soda ash, thereafter heating the mixture to obtain first a sluggishly flowing plastic mass and thereafter a dry appearing material containing about 5 to 15% moisture, the temperature of heating being maintained below the caramelization temperature of the dextrin.

3. A process for preparing a cold water soluble dextrin adhesive which comprises the steps of adding to dextrin about 15 to 75%, by weight of the dextrin, of water to moisten the dextrin, and 7 to 30% of inorganic alkaline salt, thereafter heating the mixture to obtain, first, a sluggishly flowing plastic mass, and thereafter an apparently dry material having from about 5 to 15% moisture.

4. A cold water soluble adhesive prepared according to the process of claim 3.

5. A cold water soluble adhesive prepared according to the process of claim 1.

References Cited in the file of this patent

UNITED STATES PATENTS

| | | |
|---|---|---|
| 1,894,570 | Phillips | Jan. 17, 1933 |

FOREIGN PATENTS

| | | |
|---|---|---|
| 19,499 | Great Britain | of 1903 |
| 579,702 | Great Britain | Aug. 13, 1946 |